US011255463B2

(12) United States Patent
Thurau

(10) Patent No.: US 11,255,463 B2
(45) Date of Patent: Feb. 22, 2022

(54) VALVE UPPER PART

(71) Applicant: Fluehs Drehtechnik GmbH, Luedenscheid (DE)

(72) Inventor: Friedrich Thurau, Herscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 0 days.

(21) Appl. No.: 16/964,295

(22) PCT Filed: May 21, 2019

(86) PCT No.: PCT/EP2019/063036
§ 371 (c)(1),
(2) Date: Jul. 23, 2020

(87) PCT Pub. No.: WO2020/007528
PCT Pub. Date: Jan. 9, 2020

(65) Prior Publication Data
US 2021/0033215 A1 Feb. 4, 2021

(30) Foreign Application Priority Data
Jul. 2, 2018 (EP) .................................. 18181240

(51) Int. Cl.
*F16K 11/085* (2006.01)
*F16K 41/04* (2006.01)
*F16K 3/08* (2006.01)

(52) U.S. Cl.
CPC .............. *F16K 41/046* (2013.01); *F16K 3/08* (2013.01); *Y10T 137/86871* (2015.04)

(58) Field of Classification Search
CPC .... F16K 41/046; F16K 41/066; F16K 41/043; F16K 41/063; Y10T 137/6014; Y10T 137/6106
(Continued)

(56) References Cited

U.S. PATENT DOCUMENTS 3,633,870 A * 1/1972 Bayer ..................... F16K 41/04
251/270
4,078,763 A * 3/1978 Yamamoto ............ F16K 5/0647
137/315.2
(Continued)

FOREIGN PATENT DOCUMENTS

| DE | 32 07 895 A1 | 9/1983 |
|---|---|---|
| DE | 33 23 008 A1 | 1/1985 |
| DE | 36 38 180 C2 | 8/1988 |

OTHER PUBLICATIONS

International Search Report in PCT/EP2019/063036, dated Aug. 12, 2019.

*Primary Examiner* — Robert K Arundale
(74) *Attorney, Agent, or Firm* — Collard & Roe, P.C.

(57) ABSTRACT

A valve upper part, in particular for sanitary fittings, includes a sleeve-type head piece, which can be fastened in a valve housing of a fitting and through the center of which a spindle extends, which has a handle connection and is mounted for rotation about the longitudinal axis of the spindle and by which a valve body can be actuated, a groove being formed in the spindle, which groove receives an elastic sliding bush, which radially surrounds at least some regions of the spindle and which lies against at least some regions of the inner lateral surface of the head piece.

6 Claims, 9 Drawing Sheets

Figure 1:
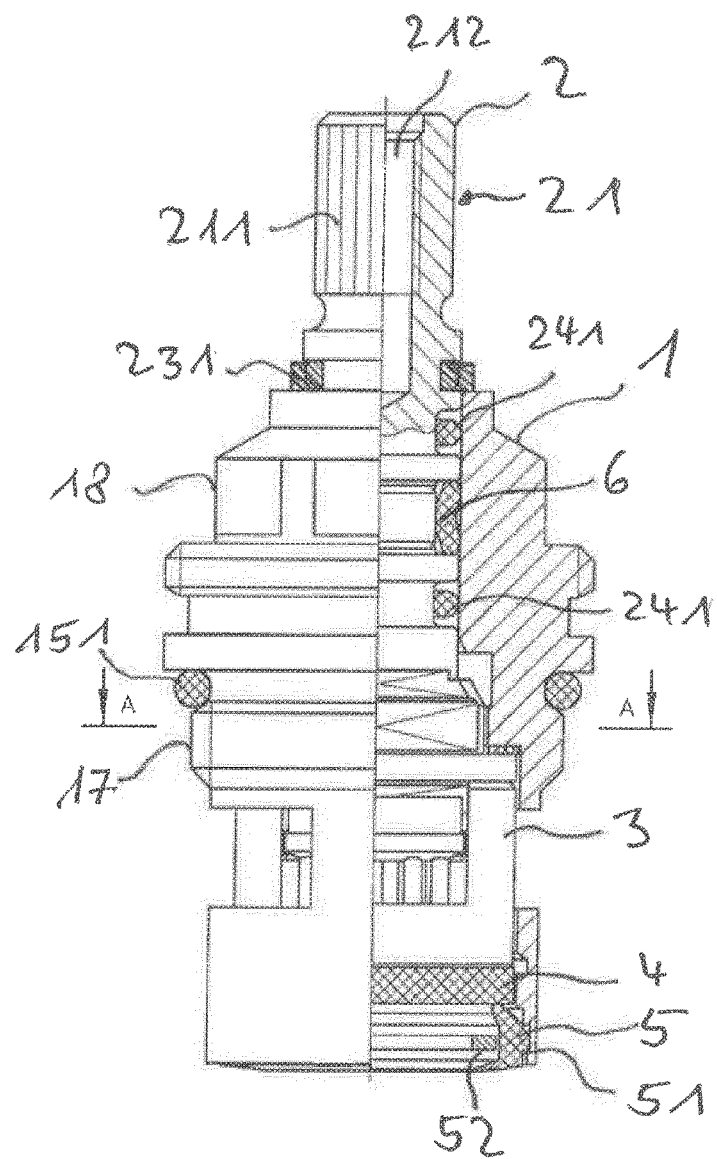
Figure 1:
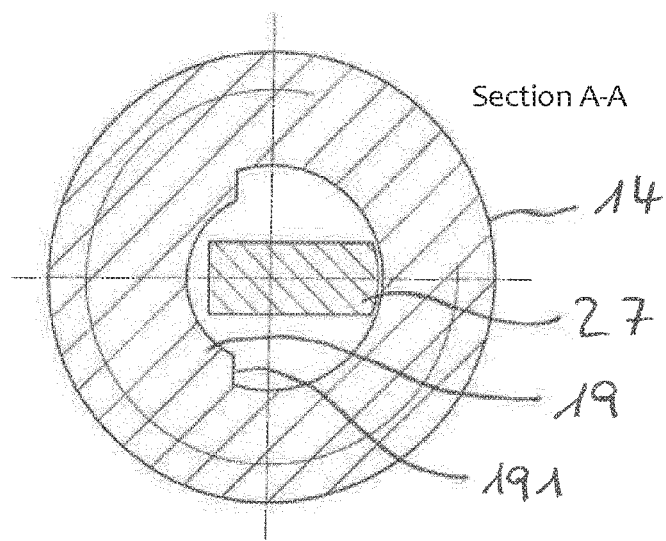

(58) Field of Classification Search
USPC .................................................. 251/214, 264
See application file for complete search history.

(56) References Cited

U.S. PATENT DOCUMENTS

| | | | | | |
|---|---|---|---|---|---|
| 4,408,745 | A | * | 10/1983 | Swiers | F16K 1/34 |
| | | | | | 137/315.12 |
| 4,899,982 | A | | 2/1990 | Lange | |
| 5,580,031 | A | * | 12/1996 | Lorch | F16K 1/42 |
| | | | | | 137/454.5 |
| 5,681,028 | A | * | 10/1997 | Cook | F16K 3/08 |
| | | | | | 251/170 |
| 6,988,512 | B1 | * | 1/2006 | Wang | F16K 3/08 |
| | | | | | 137/625.47 |
| 2003/0205282 | A1 | * | 11/2003 | Anderson | F16K 11/0876 |
| | | | | | 137/625.47 |
| 2005/0252560 | A1 | * | 11/2005 | Anderson | F16K 27/067 |
| | | | | | 137/625.47 |
| 2006/0192166 | A1 | * | 8/2006 | Lange | F16K 3/08 |
| | | | | | 251/264 |
| 2007/0235678 | A1 | * | 10/2007 | Chung | F16K 27/02 |
| | | | | | 251/214 |
| 2015/0041697 | A1 | * | 2/2015 | Hermann | F16K 1/38 |
| | | | | | 251/264 |
| 2016/0084403 | A1 | | 3/2016 | Kemp et al. | |
| 2016/0091108 | A1 | * | 3/2016 | Ko | E03B 9/027 |
| | | | | | 251/264 |
| 2017/0146134 | A1 | * | 5/2017 | Broechler | F25J 1/0022 |
| 2019/0024820 | A1 | * | 1/2019 | Thurau | F16K 3/24 |
| 2019/0376616 | A1 | * | 12/2019 | Gradle | F16K 41/026 |

* cited by examiner a)

b)

Section A-A a)

b)

Section A-A a)

b)

Section B-B c)

Section C-C a)

b)

a)

b)

a)

b)

a)

b)

Section B-B c)

Section C-C a)

b)

a)

b)

VALVE UPPER PART

CROSS REFERENCE TO RELATED APPLICATIONS

This application is the National Stage of PCT/EP2019/063036 filed on May 21, 2019, which claims priority under 35 U.S.C. § 119 of European Application No. 18181240.5 filed on Jul. 2, 2018, the disclosure of which is incorporated by reference. The international application under PCT article 21(2) was not published in English.

The invention relates to a valve upper part, in particular for sanitary fittings, having a sleeve-type head piece that can be fastened into a valve housing of a fitting, through the center of which piece a spindle passes, which spindle has a handle connector and is mounted so as to rotate about its longitudinal axis, by way of which spindle a valve body can be actuated.

Valve upper parts of the aforementioned type are known, for example, from DE 32 07 895 and DE 33 23 008. In the case of the known valve upper parts, the following problems occur. A slight radial play exists between the spindle and the head piece, which play is transferred to the operating handle attached to the handle connector, by way of the handle connector, and thereby the impression of significant play is imparted, caused by the lever of the handle. Furthermore, in the case of fittings mounted horizontally on a wall, in the case of which a heavy, asymmetrically structured operating handle is mounted on the valve upper part, it can come about, by means of the torque exerted on the spindle of the valve upper part by the handle, that when the valve is open, the handle will pivot from a radially upper position into a radially lower position on its own.

In DE 36 38 180 C2, it is proposed, in this regard, to provide the head piece of the valve upper part with a ring-shaped recess on the inner edge that faces the handle connector, in which recess a bearing, which is essentially sleeve-shaped, biased, and elastic within limits, is pressed into contact against one of the ring surfaces of the spindle of the valve upper part and into catch engagement with one of the grooves introduced into the spindle. This solution has proven itself over decades and is implemented up to the present day. However, this solution is rather complicated, in particular in the course of the increasing miniaturization of valve upper parts. Furthermore, in the case of frequent use, it can happen that the plastic bearing that is pressed in is plastically deformed, and this has a negative effect on the feel during operation of the valve upper part.

This is where the invention seeks to provide a remedy. The invention is based on the task of making available a valve upper part in which play between spindle and head piece as well as unwanted pivoting movements between spindle and head piece are prevented, which is easy to produce even in the case of small dimensions of the valve upper part, and in which a feel that remains the same is guaranteed even over a long period of time. According to the invention, this task is accomplished by means of a valve upper part having the characteristics of the characterizing part of claim 1.

With the invention, a valve upper part is created in which both play between spindle and head piece in the radial direction and unwanted pivoting movements of the spindle in the head piece are prevented, which is easy to produce even in the case of small dimensions of the valve upper part, and in which a feel that remains the same is furthermore guaranteed even over a long period of time. Because of the fact that a groove is introduced into the spindle, which groove holds an elastic sliding bushing that engages radially around the spindle, at least in certain regions, which bushing lies against the inner mantle surface of the head piece, at least in certain regions, the complicated introduction of an axial recess into the head piece for accommodating the elastic plastic bearing, as required in the state of the art, is no longer necessary. All that is required is a further groove in the spindle for accommodating the sliding bushing. In this regard, the elastic sliding bushing arranged in the groove is arranged completely elastically between spindle and head piece, so that irreversible plastic deformations, as they can occur in the case of a pressed-in plastic bearing according to the state of the art, are prevented. Preferably, the sliding bushing is produced from plastic, preferably from an elastomer.

In a further development of the invention, the sliding bushing is configured to have a slit. As a result, easy installation of the sliding bushing is made possible.

In an embodiment of the invention, the sliding bushing can be clipped onto the groove bottom of the groove. As a result, easy, automated installation of the sliding bushing is made possible. Furthermore, the use of sliding bushings made of different materials for different purposes of use can be implemented in simple manner within a production process.

In a further embodiment of the invention, the slit of the sliding bushing is configured in V shape. As a result, the sliding bushing can easily be clipped onto the groove bottom of the spindle, and thereby installation is further simplified.

In a further development of the invention, the sliding bushing is arched in such a manner that it lies against both the groove bottom and the inner mantle surface of the head piece only in certain regions. As a result, the elastic behavior of the sliding bushing is further improved, and thereby plastic deformations are further prevented. A feel of the valve upper part that remains the same even over a very long period of time is thereby guaranteed.

In a further embodiment of the invention, the sliding bushing lies against the groove bottom with a radially circumferential first contact surface, and lies against the inner mantle surface of the head piece with at least one, preferably two outer radially circumferential second contact surfaces, which are arranged axially offset relative to the at least one first contact surface. As a result, the elastic behavior of the sliding bushing is further improved. Alternatively, the sliding bushing can also lie against the inner mantle surface of the head piece with an outer radially circumferential second contact surface, and can lie against the groove bottom with two circumferential first contact surfaces, which are arranged axially offset relative to the second contact surface. A nested arrangement of multiple contact surfaces that lie against the groove bottom of the spindle and against the inner mantle surface of the head piece is also possible.

In a further embodiment of the invention, the spindle has two further grooves, each accommodating a sealing ring, between which the groove that accommodates a slide bushing is arranged. In this way, the sliding bushing is sealed off, for one thing, relative to the drinking water, and for this reason the material for the sliding bushing can be freely selected. For another thing, the sliding bushing is shielded against external effects, such as dirt or also cleaning agents, for example.

Other further developments and embodiments of the invention are indicated in the remaining dependent claims.

Figure 2:
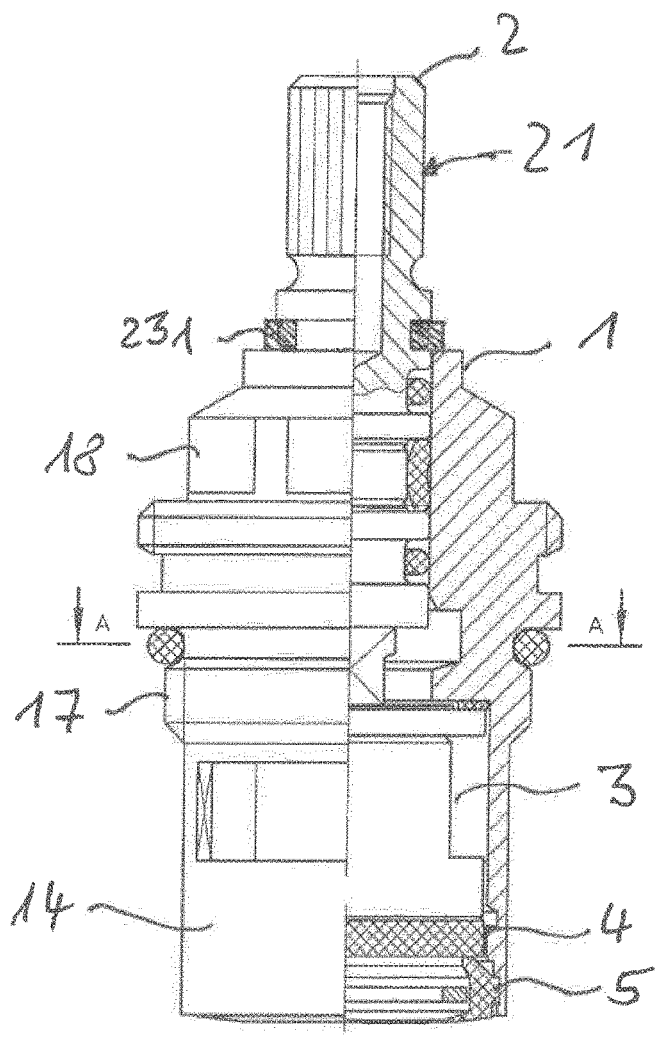
Figure 2:
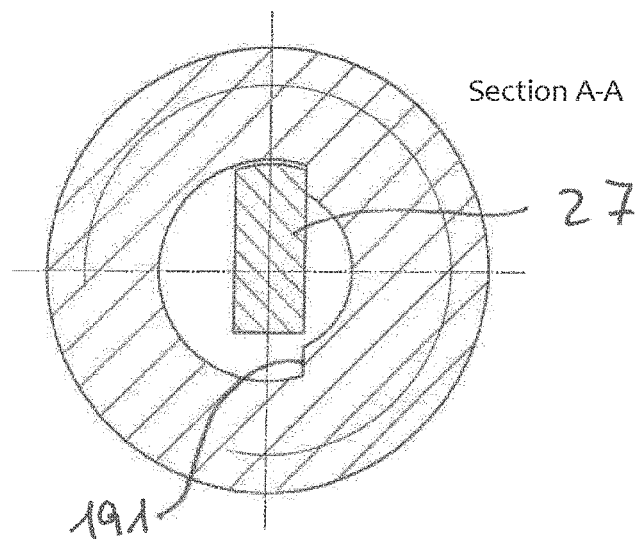
Figure 3:
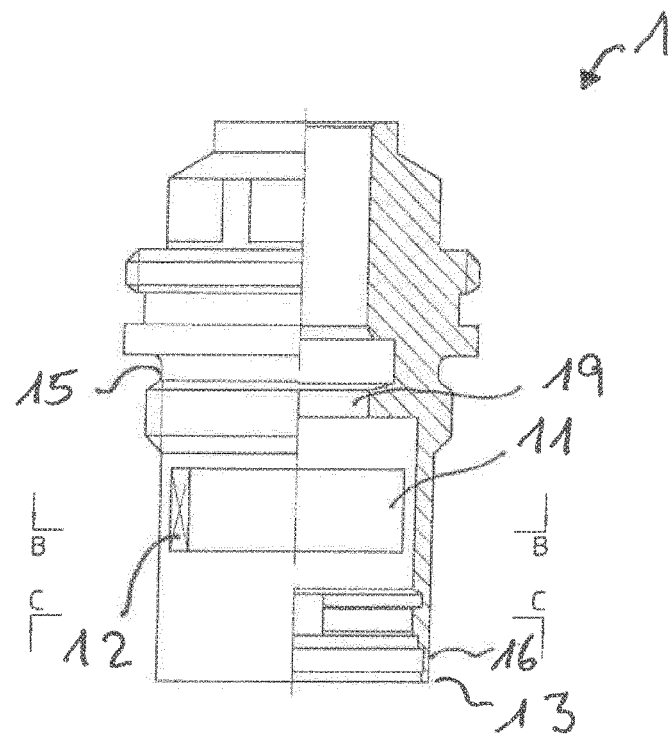
Figure 3:
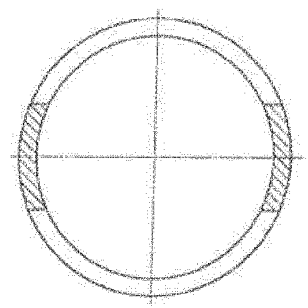
Figure 3:
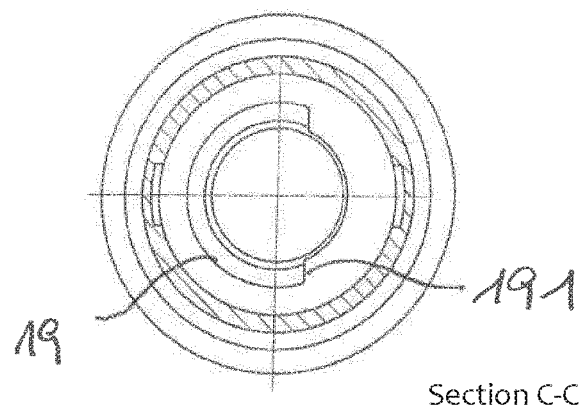
Figure 4:
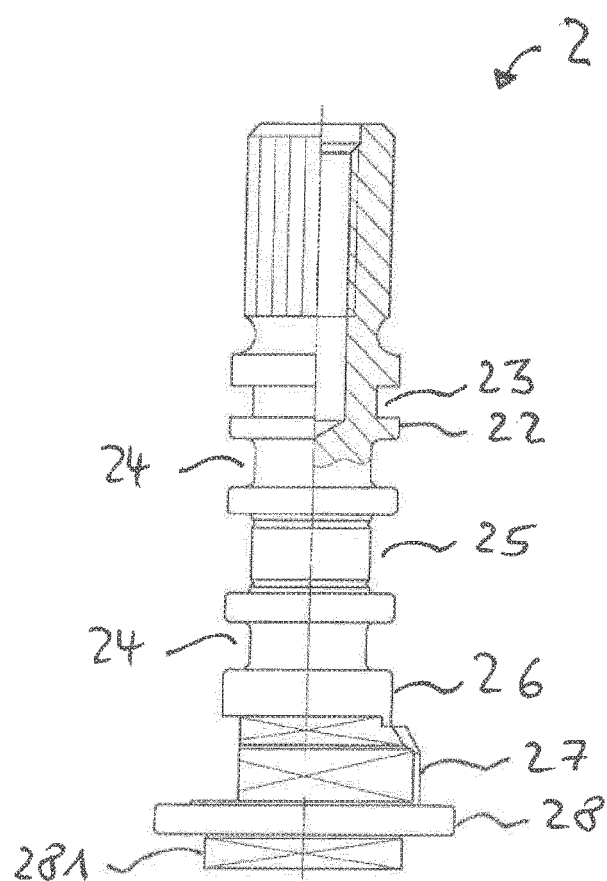
Figure 4:
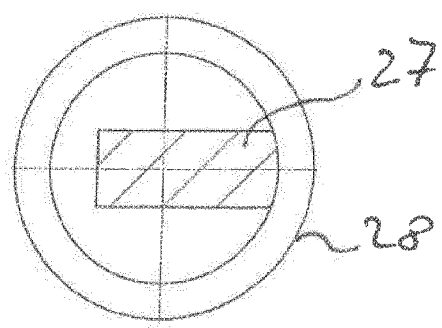
Figure 5:
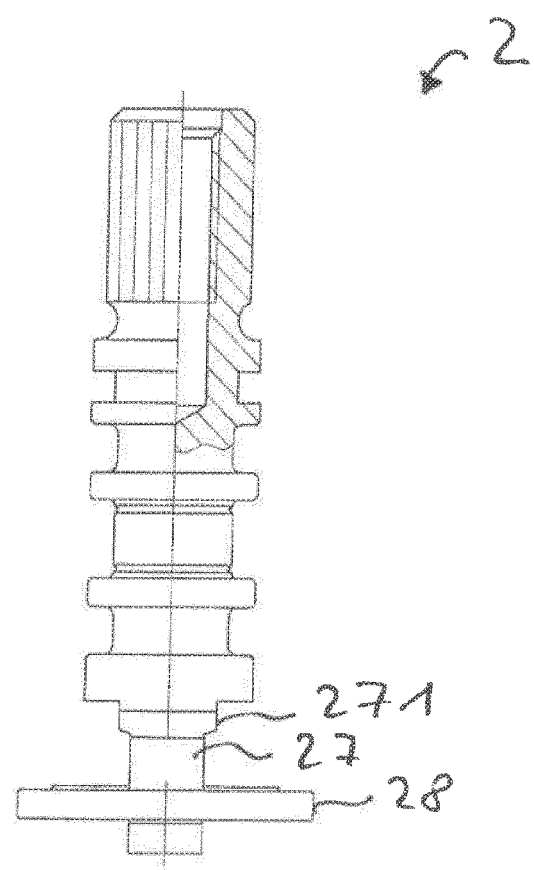
Figure 5:
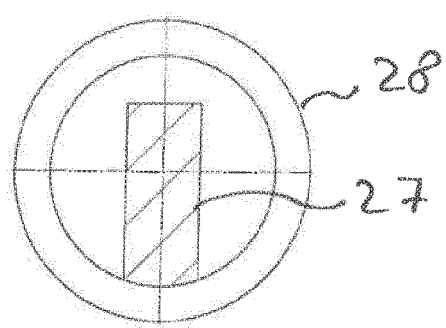
Figure 6:
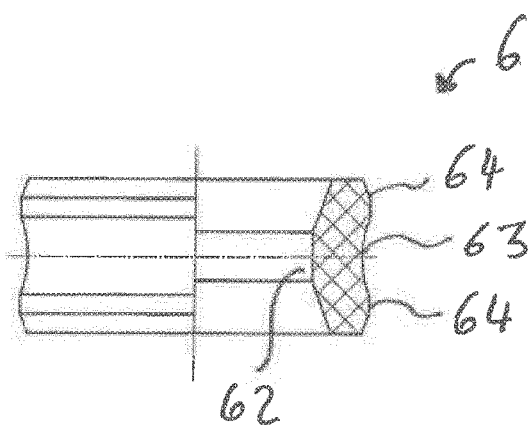
Figure 6:
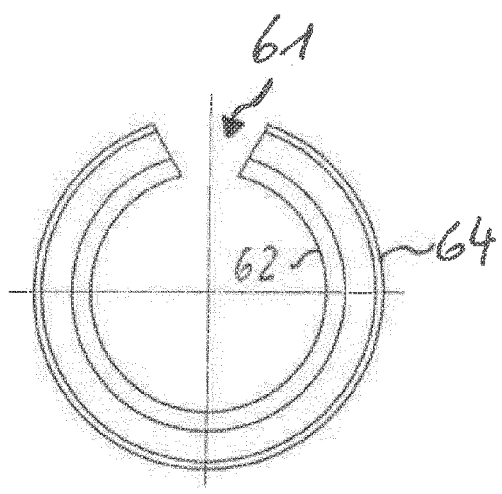
Figure 7:
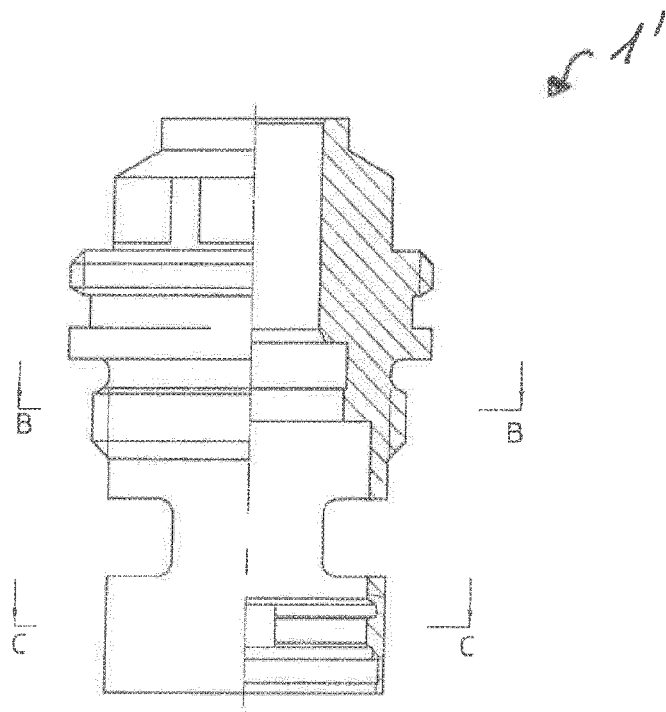
Figure 7:
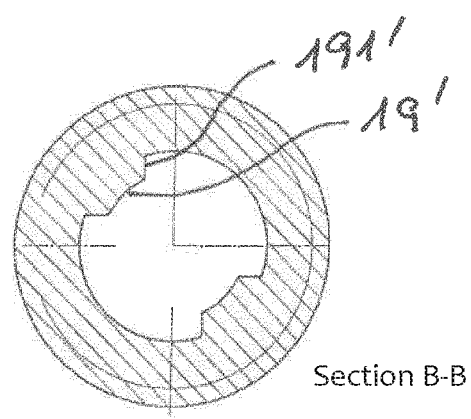
Figure 7:
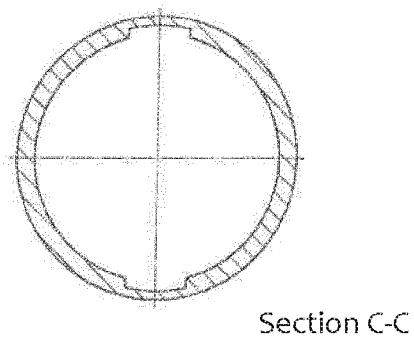
Figure 8:
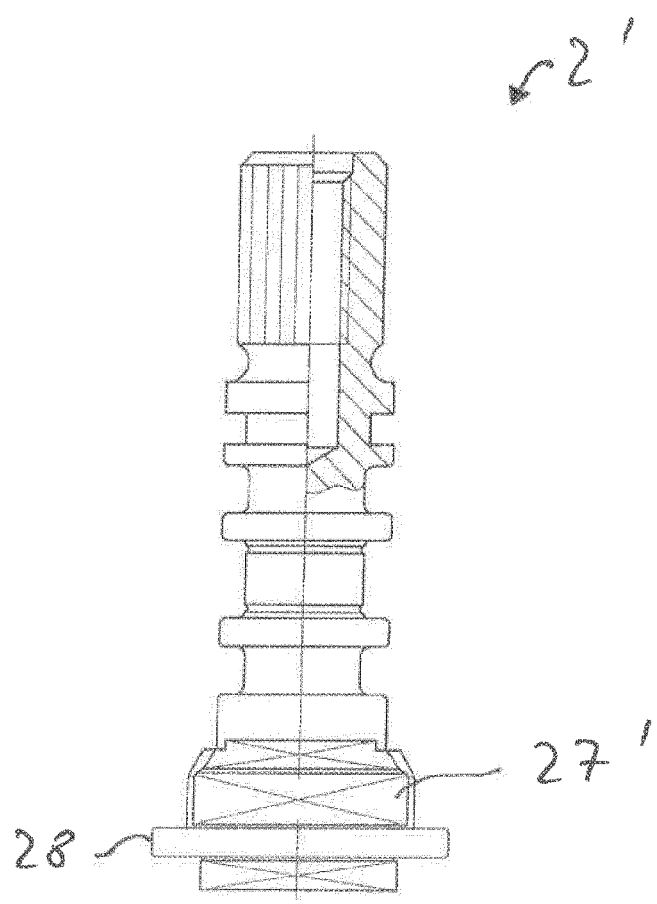
Figure 8:
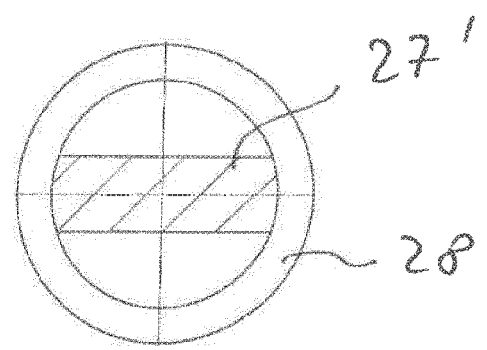
Figure 9:
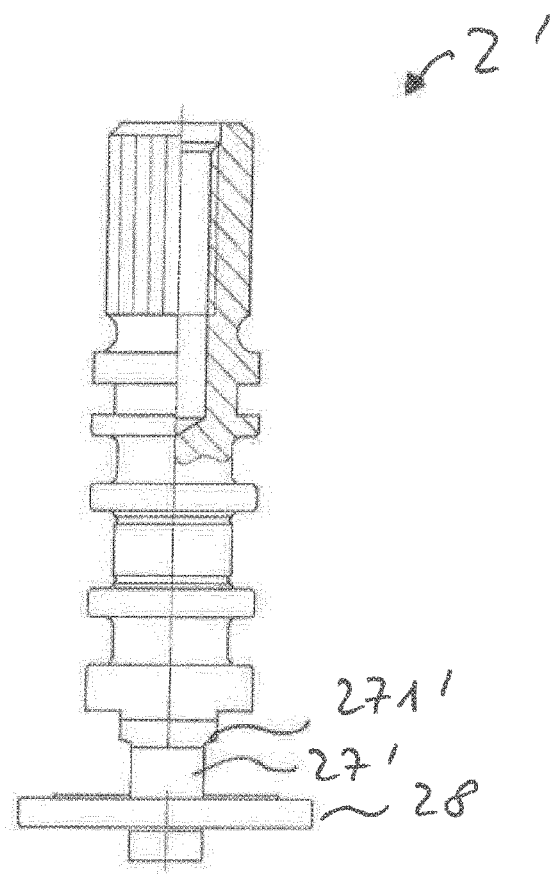
Figure 9:
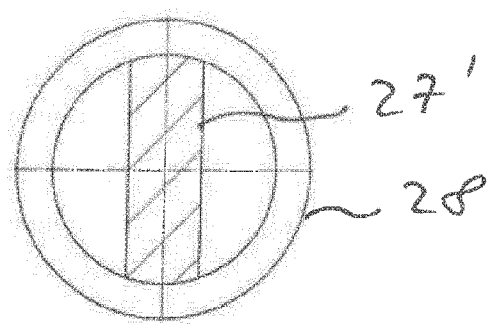

Exemplary embodiments of the invention are shown in the drawings and will be described in detail below. The figures show:

FIG. 1 the schematic representation of a valve upper part with spindle in the center position
  a) in partial section;
  b) in cross-section A-A;

FIG. 2 the schematic representation of the valve upper part from FIG. 1 with spindle in the contact position
  a) in partial section;
  b) in cross-section A-A;

FIG. 3 the schematic representation of the head piece of the valve upper part from FIG. 1
  a) in partial section;
  b) in cross-section B-B;
  c) in cross-section C-C;

FIG. 4 the schematic representation of the spindle of the valve upper part from FIG. 1
  a) in partial section;
  b) in cross-section;

FIG. 5 the schematic representation of the spindle from FIG. 4 in a position rotated by 90°
  a) in partial section;
  b) in cross-section;

FIG. 6 the schematic representation of the sliding bushing of the valve upper part from FIG. 1
  a) in partial section;
  b) in a top view;

FIG. 7 the schematic representation of the head piece of a valve upper part in a further embodiment with a pivot angle restricted to 90°
  a) in partial section;
  b) in cross-section B-B;
  c) in cross-section C-C;

FIG. 8 the schematic representation of a spindle for insertion into the head piece from FIG. 7
  a) in partial section;
  b) in cross-section through the cantilever arm (top view);

FIG. 9 the schematic representation of the spindle from FIG. 8 in a position rotated by 90°
  a) in partial section;
  b) in cross-section through the cantilever arm (top view).

The valve upper part selected as an exemplary embodiment has a head piece 1 through the center of which a spindle 2 passes, radially guided in the head piece. A control disk 3 is connected with the spindle 2 with shape fit and radially guided in the head piece 1. An inlet disk 4 is provided in the head piece 1 at the end of the control disk 3 facing away from the spindle 2, which disk is followed by a lip seal 5, which comes to lie against the valve seat of a fitting, not shown.

The head piece 1 is formed from a symmetrical hollow body, the two end faces of which are open. On its side facing the fitting, not shown, the head piece 1 has a sleeve-shaped part 14. Passage windows 11 are provided in the sleeve-shaped part 14, which windows are delimited by longitudinal ridges 12. In the exemplary embodiment, two windows 11 delimited by longitudinal ridges 12 are provided. After the head piece 1 is introduced into a fitting, a collar 13 of the head piece 1 lies on the housing of the fitting. The collar 13 has a ring groove 15 on its side facing the passage window 11 for accommodating an O-ring 151. An undercut 16 is arranged in the sleeve-shaped part 14, on the inside, in the region of the end facing the valve seat. An outside thread 17 is formed on the head piece 1 on its end opposite the passage window 11, followed by an external hex 18 for engagement of a screw-driving tool.

The spindle is essentially structured to be solid. It is provided with a handle connector 21 at its end face that faces away from the water inflow, which connector is structured as an outer polygon 211 on the outside and is provided with a dead-end hole 212 having an inside thread for fastening on a rotating handle, not shown. A cylindrical section 22 follows the handle connector 21, with which section the spindle 2 is radially guided in the head piece 1 and in which section two ring grooves 24 are introduced for accommodating O-rings 241, which seal the spindle 2 off with regard to the head piece 1. A further ring groove 25 for accommodating a sliding bushing 6 is arranged between the ring grooves 24, which each accommodate an O-ring 241. Furthermore, a cut-in 23 is provided between the handle connector 21 and the cylindrical section 22, into which a shaft locking clip 231 in the form of a retaining ring is resiliently laid.

A cantilever arm 27 is formed axially on the cylindrical section 26, which arm has an essentially T-shaped cross-section and projects beyond the diameter of the cylindrical section 25 on one side. Because of the T-shaped cross-section of the cantilever arm 27, an overhang 271 is formed on its side walls, in each instance. The cantilever arm 271 is configured in such a manner that it lies against a contact surface 191 of a stop 19 formed on the inner wall of the head piece 1, at two defined pivoting positions, in each instance, with a side surface, wherein the overhand 271 disposed on this side surface projects beyond the stop 19 with a slight axial distance. A disk 28 is formed on the cantilever arm 27, which has a driver 281 on its side facing the fitting, not shown. With its top side that lies opposite the driver 281, the disk 28 lies against the underside of the stop 19 of the head piece 1, which stop is configured in the form of a ridge in the shape of an arc, which underside faces this disk 28.

The control disk 3 is essentially configured as a circular disk, from which a circle segment has been removed. The circle segment has an angle of approximately 180° in the exemplary embodiment. On its top, facing the spindle 2, the control disk 3 is furthermore provided with an accommodation for the driver 281 of the spindle 2.

Bordering on the inlet disk 4, a lip seal 5 is introduced into the head piece 1, which seal is provided with a ridge 51 circumferentially on the outside, which ridge engages into the undercut 16 provided for this purpose in the end of the sleeve-shaped part 14 of the head piece 1. The lip seal 5 is held in its position by way of a support ring 52 that has been introduced, wherein the lips of the lip seal 5 lie against the inlet disk 4 and against the fitting seat, not shown, forming a seal.

The sliding bushing 6 is configured as a ring-shaped plastic body, which is divided on one side by a V-shaped slit 61. The inner mantle surface of the sliding bushing 6 is configured to be essentially convex, and has a circumferential first contact surface 62 arranged in the center. The outer mantle surface of the slide bushing 6, lying opposite the first contact surface 62, has a concave curvature 63, and thereby two circumferential second contact surfaces 64 that are arranged parallel to one another are delimited. In the installed state, the sliding bushing 6 lies against the groove bottom of the ring groove 25 with the first contact surface 62, wherein it lies against the inner mantle surface of the head piece 1 with its second contact surfaces 64, which are arranged offset relative to the first contact surface. (Alternatively, the sliding bushing 6 can also have a centered second contact surface on its outer mantle surface and two first contact surfaces, running parallel to one another and arranged offset relative to the inner second contact surface, on its inner mantle surface.) In this way, an elastic and completely reversible sliding bushing 6 is achieved between the spindle 2 and the head piece 1. The sliding bushing 6 can be easily clipped onto the ring groove 25 of the spindle 2 by means of the V-shaped slit 61.

In FIGS. 7 and 8, head piece and spindle of a valve upper part are shown in a further embodiment, in which the control disk has a circular cutout of approximately 90° and a maximum angle of rotation of the spindle of 90° is set up. For this purpose, the cantilever arm 27', which once again has a T-shaped cross-section, thereby forming an overhang 271' on both of its side surfaces, in each instance, is configured in such a manner that it projects beyond the diameter of the cylindrical section 25 of the spindle 2' on two diametrically opposite sides. In this exemplary embodiment, two stops 19' configured as arc-shaped ridges are arranged within the head piece 1, opposite one another, against the stop surfaces 191' of which a side surface of the cantilever arm 27' lies at the end in a contact position of the spindle 2', in each instance. In this regard, the overhang 271' arranged on the respective side surface once again projects beyond the stop 19' against which the side surface lies. In this embodiment, the cantilever arm 27' can consequently support itself on a stop 19', in each instance, with two overhangs 271', in every contact position of the spindle 2'.

The invention claimed is:

1. A valve upper part having a sleeve-type head piece that fastens into a valve housing of a fitting, through the center of which piece a spindle passes, which spindle has a handle connector and is mounted so as to rotate about its longitudinal axis, by way of which spindle a valve body is actuated,
   wherein a groove comprising a groove bottom is introduced into the spindle, which groove holds an elastic sliding bushing that engages radially around the spindle, at least in certain regions, which bushing lies against an inner mantle surface of the head piece, at least in certain regions,
   wherein the sliding bushing is configured to have a slit, and
   wherein the slit of the sliding bushing is configured in V shape.

2. The valve upper part according to claim 1, wherein the sliding bushing is produced from plastic.

3. The valve upper part according to claim 1, wherein the sliding bushing clips onto the groove bottom of the groove.

4. A valve upper part having a sleeve-type head piece that fastens into a valve housing of a fitting, through the center of which piece a spindle passes, which spindle has a handle connector and is mounted so as to rotate about its longitudinal axis, by way of which spindle a valve body is actuated,
   wherein a groove comprising a groove bottom is introduced into the spindle, which groove holds an elastic sliding bushing that engages radially around the spindle, at least in certain regions, which bushing lies against an inner mantle surface of the head piece, at least in certain regions, and
   wherein the sliding bushing is arched in such a manner that the sliding bushing lies against both the groove bottom of the groove and the inner mantle surface of the head piece only in certain regions.

5. The valve upper part according to claim 4, wherein the sliding bushing lies against the groove bottom of the groove on at least one radially circumferential first contact surface, and lies against the inner mantle surface of the head piece on at least one radially circumferential second contact surface, which is arranged axially offset relative to the at least one first contact surface.

6. A valve upper part having a sleeve-type head piece that fastens into a valve housing of a fitting, through the center of which piece a spindle passes, which spindle has a handle connector and is mounted so as to rotate about its longitudinal axis, by way of which spindle a valve body is actuated,
   wherein a groove comprising a groove bottom is introduced into the spindle, which groove holds an elastic sliding bushing that engages radially around the spindle, at least in certain regions, which bushing lies against an inner mantle surface of the head piece, at least in certain regions, and
   wherein the spindle has two further grooves, each accommodating a sealing ring, between which grooves the sliding bushing is arranged.

* * * * *